US008648485B1

(12) United States Patent
Grossi

(10) Patent No.: US 8,648,485 B1
(45) Date of Patent: Feb. 11, 2014

(54) MOTION ENERGY COLLECTION DEVICE

(76) Inventor: Thomas Ralph Grossi, North Dighton, MA (US)

( * ) Notice: Subject to any disclaimer, the term of this patent is extended or adjusted under 35 U.S.C. 154(b) by 136 days.

(21) Appl. No.: 13/199,620

(22) Filed: Sep. 6, 2011

(51) Int. Cl.
*F03B 13/00* (2006.01)

(52) U.S. Cl.
USPC .............................................. 290/53; 290/42

(58) Field of Classification Search
USPC ...................................................... 290/42, 53
See application file for complete search history.

(56) References Cited

U.S. PATENT DOCUMENTS

| 1,823,190 | A | * | 9/1931 | Christie | 60/506 |
| 2,384,536 | A | * | 9/1945 | Crumble | 60/711 |
| 4,228,360 | A | * | 10/1980 | Navarro | 290/43 |
| 8,049,357 | B2 | * | 11/2011 | Saavedra | 290/54 |
| 2008/0272600 | A1 | * | 11/2008 | Olson | 290/53 |

* cited by examiner

*Primary Examiner* — Tho D Ta
(74) *Attorney, Agent, or Firm* — Joseph H. Killion

(57) ABSTRACT

A improved energy collection device is disclosed comprising a base a first shaft, rotatable about an axis, a second shaft fixedly mounted to the base, rotatably adapted around the first shaft defining spring housing. A spring is contained within the spring housing of the second shaft attached at a first end to the first shaft and at a second end to the second shaft. A winder is attached to the base, connected to the energy source which rotates the winder and is connected at a second point to the second shaft which is rotated by the winder tightening the second end of the spring to a designed point then unwinding the first end of the spring rotating the first shaft while continuing to wind the second spring end A generator is connected to the end of the first shaft generating electricity as the first shaft is rotated.

6 Claims, 4 Drawing Sheets

$\omega_A$ = angular velocity of center shaft
$\omega_B$ = angular velocity of outside shaft If $\omega_A < \omega_B$ THEN SPRING IS COMPRESSED

MOTION ENERGY COLLECTION DEVICE

BACKGROUND OF THE INVENTION

This invention relates to a motion energy collection device and system for harvesting any number of energy generating situations both which occur naturally such as the waxing and waning of the ocean tides, waves and tidal currents; the rise and fall of the swells in the ocean, winds, thermal springs. In addition to these naturally occurring fluctuations in kinetic or potential energy also the harnessing of man made energy generating situations such as the turning of the wheels in an automobile, bicycle or so called "self winding watches" into a constant potentially uninterrupted energy supply Many methods and apparatuses are disclosed in the prior art which are designed to capture such useful energy naturally occurring or otherwise.

U.S. Pat. No. 4,781,023 (Gordon), teaches a wave driven power generation system Which utilizes a float or an array of similar floats arranged in a pre-established pattern to be responsive to and capture the broad spectrum of frequencies present in ocean waves and to extract the maximum power from the waves.

U.S. Pat. No. 7,127,886 (Fielder) teaches the collection of both of the naturally occurring and the human generated types of energy in a spring wound about a turbine.

My invention is a motion energy collection system and method which addresses needs which are not addressed in the prior art. In the prior art the energy collection systems are not continuous. causing constant delays in the energy collection process.

In the prior art, once the "spring" or a substitute therefore is sufficiently wound, the energy collection process must be halted so that the energy stored in the wound spring can be converted into useful electricity for example, by running an electric generator.

This electricity commonly is stored in batteries (e.g. wind power) or otherwise utilized and the energy collecting process can then be restarted and the process repeated. This results in the halting of the energy collection process while the batteries are charged or the electricity is generated and dispersed.

My device permits the continuous uninterrupted harvesting of naturally occurring energy or man made energy by teaching a continues uninterrupted harvesting process which does not require batteries for storage, the stoppage of the energy harvesting phase or any other interruption of the energy harvesting phase to either convert the energy collected into a useful form of power or to "unwind the spring". Further my invention can be utilized in any situation where the shaft within a shaft of my device can both be wound and unwound at the same time. Typical situations are for example to generate electrical power in an automobile to run the lighting in the automobile while the automobile is moving. With some slight modifications wind can supply the power to be collected. My motion energy collection device has the further advantages that it can utilize otherwise useless structures like abandoned oil well superstructures as the base.

My device is inexpensive to manufacture and install.

Several modifications, changes and adaptions can be made by those skilled in the art without departing from the scope of my invention.

Therefore different means may be substituted by other types of design and are anticipated by my invention These and other advantages of my invention will become apparent when viewed in light of the accompanying drawings and the following description

SUMMARY OF INVENTION

I have discovered an improved motion energy collection device for extracting energy from an energy source My improved motion energy collection device includes a base, a first shaft means which is rotatable about an axis, a second shaft means which is affixed to the base and rotatably adapted around the first shaft means and defines a spring housing portion. A spring means is contained within the spring housing portion of the second shaft means, and attached at a first end to the first shaft means and at a second end to the second shaft means. A winder means is adapted to the base and connected at one point to the energy source which rotates the winder means which is connected at a second point to the second shaft means which is rotated by the winder means, tightening the second end of the spring means to a designed point then unwinding the first end of the spring means rotating the first shaft means while continuing to wind the second end of the spring. means each time the power arm means moves from the first position at the bottom of the swell and the second position at the top of the swell.

A generator means is connected to the end of the first shaft means whereby electricity is generated by the rotation of the first shaft means.

I prefer that the winder means, as described in the preferred embodiment include a ratchet means which engages around the longitudinal grooves of the second shaft means as the power arm means is raised by the swell moving from the bottom of the swell to the top of the swell, rotates the second shaft means and releases until the next swell cycle.

The second shaft means tightens the spring means to a designed point at which point the spring means starts to unwind at the second end connected to the first shaft means rotating the first shaft which turns the first shaft means which is then converted into useful electricity by the generator means.

I also prefer that bearing means be fixedly mounted to the base and rotatable positioned between the first shaft means and the second shaft means permitting the first shaft means to rotate as the spring means unwinds.

I also prefer that a torque wrench be positioned adjacent and outside the ratchet means to prevent the spring from being overwound.

This energy is then available to be distributed through a cable, for example on a continuous uninterrupted basis.

The preferred embodiment is only an example of my invention as I also envision the winder to be powered, for example, by the energy generated by turning tires and other man-made energy which is harvestable.

I also prefer that gear means be positioned at the end of the first shaft means to maximize a constant velocity to the generator.

It is an advantage of my invention that the useful generation of the energy is continuous and does not require storage of the harvested energy in batteries for example.

There is no stoppage of the harvesting of energy in my invention as would be required if the process had to be stopped for example, to allow the spring or its equivalent to be unwound to release the harvested energy . . . My invention as disclosed in the preferred embodiment could be located on existing sites located in the oceans as, for example, abandoned drilling rigs and could financially permit this usage and the updating of these sites so that they are not simply abandoned but restored and kept up to protect against environmental disasters such as the oil spills in the Gulf of Mexico.

... Other advantages of my invention are that it is inexpensive to manufacture and easy to install.

... These and other advantages of my invention will become apparent in the light of the accompanying drawings and the following description.

BRIEF DESCRIPTION OF THE DRAWINGS

A detailed description of the preferred embodiment is set forth in the accompanying drawings wherein.

DETAILED DESCRIPTION OF THE DRAWINGS OF THE PREFERRED EMBODIMENT

Figure 1:
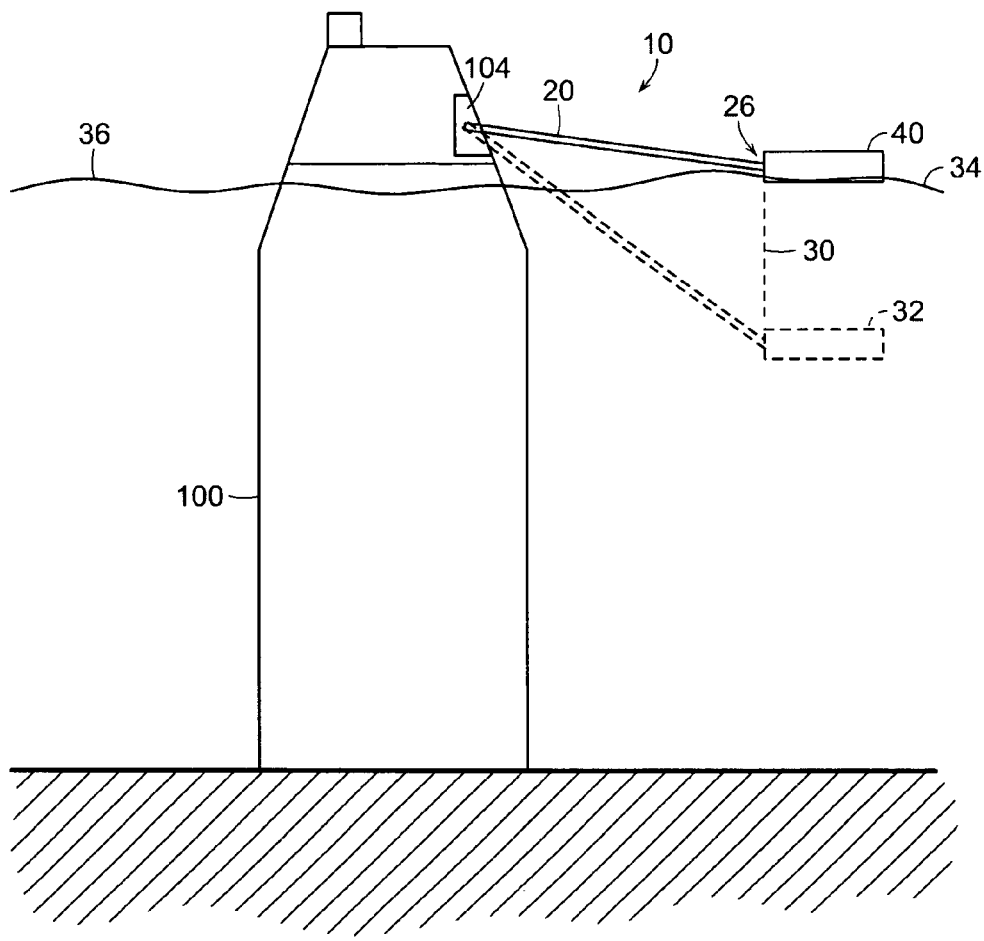
FIG. 1 is an illustrative view of the power generating system.

Referring now in particular to the accompanying drawings, my improved motion energy collection device and method is generally indicated at 10 in FIG. 1 and includes base 100 which is anchored to the ocean floor and also includes slotted opening 104 Power arm 20 which extends downwardly from slotted opening 104 is connected at end 26 to float 40 and is moveable vertically between swell depth 32 of swell 30 and swell crest 34.of swell 30.

Figure 1A:
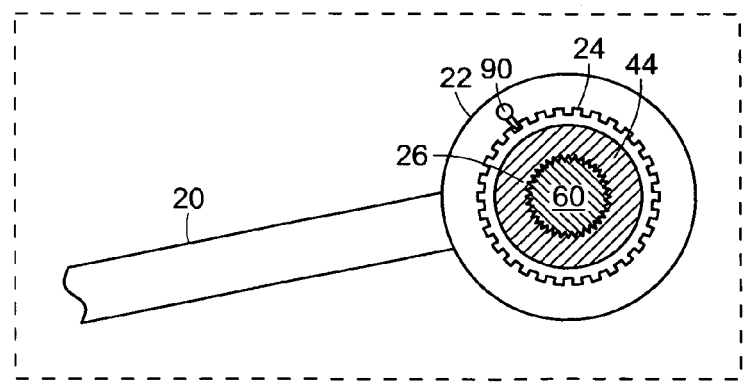
FIG. 1A is a cross sectional view of the power arm ratchet means of my device.

Power arm 20 includes ratchet connector means end 22 (, FIG. 1A) having aperture 44 therethrough.

Second shaft 60 which includes longitudinal grooves 66 (FIG. 2) and spring housing 64) adapts through aperture 44 of power arm. ratchet end 22

Power arm ratchet means end 22 includes ratchet 24 having ratchet teeth 26 which releasably engage the longitudinal grooves 66 of second shaft 60 to rotate second shaft 60 On the upward movement of power arm 20 pawl 90 engages the teeth 24 of power arm ratchet 22 so that power arm ratchet 22 does not reverse (FIG. 1-A).

On the downward movement, pawl 90 disengages from the ratchet teeth 24 of power arm ratchet means, 22 permitting power arm ratchet 22 to rotated freely without impeding the rotation of first shaft 50.

Torque wrench 25 (FIG. 2) is engaged to power arm ratchet end 22 and is mounted to second shaft 60 outside of power arm ratchet end 22.

Figure 2:
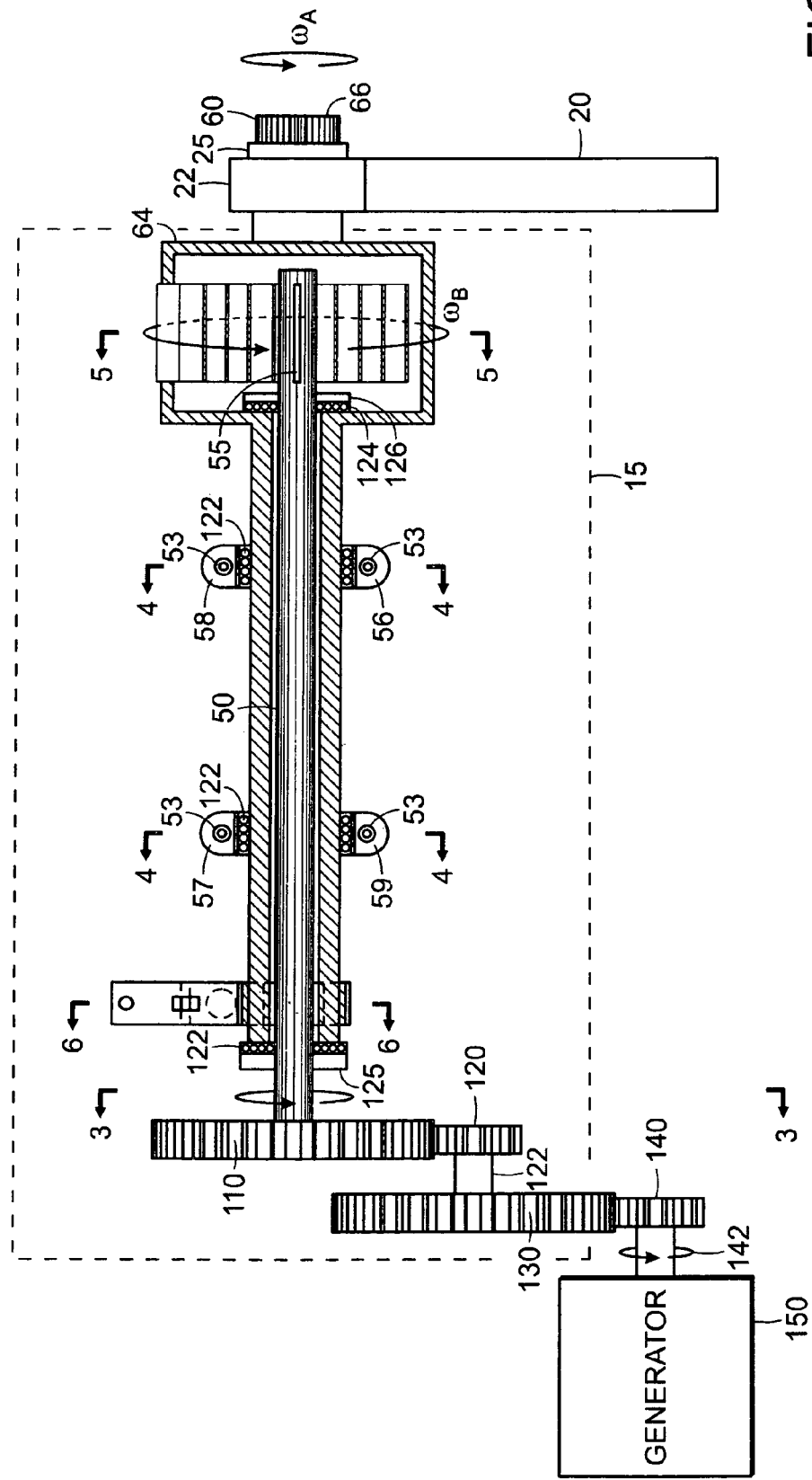
FIG. 2 is a side cross-sectional illustrative view showing the device

FIG. 2 shows first shaft 50 mounted to base 15 by bearing blocks 56,57,58,59 secured by fasteners 53 First shaft 50 defines spring slot 55 therethrough. Spring 70 is arranged in spring housing 64 includes spring ends 72, 74. Inner spring end 72 is fixedly mounted through spring slot 55 of first shaft 50 and held in place by spring bracket 76 (not shown) Outer spring end 74 adapts to slot 68 in spring housing 64 and is held in place by spring bracket 84. (not shown).

In the event that water conditions are so turbulent that the speed or the height of The swell becomes irregular, torque wrench 25 (which is preset to a chosen value) releases the power arm ratchet means end, which continues to turn without further winding spring 70 As spring 70 unwinds below this chosen value of the torque wrench, power arm ratchet means 22 reengages and winds the spring 70 once again.

On the upward movement of power arm 20 pawl 90 engages the teeth 24 of power arm ratchet 22 so that power arm ratchet 22 does not reverse.

On the downward movement, pawl 90 disengages from the ratchet teeth 24 of power arm ratchet, 22 permitting power arm ratchet 22 to rotated freely without impeding the rotation of first shaft 50.

Rotatable second shaft 60 is mounted around first shaft 50 and has lubricated ball bearings 122, 124 (FIG. 4) held in place by ball bearing stops 125, 126 (FIG. 2), placed to cushion the rotation of second shaft 60 and first shaft 50 with respect to each other. (FIG. 3)

As second shaft 60 rotates as power arm 20 raises, power arm ratchet end 22 ratchets second shaft 60 turning second shaft 60 and tightening spring 70 from the outside end 74 around first shaft 50 in a clockwise direction, spring 70 tightens around first shaft 50 at spring end 74.

Figure 4:
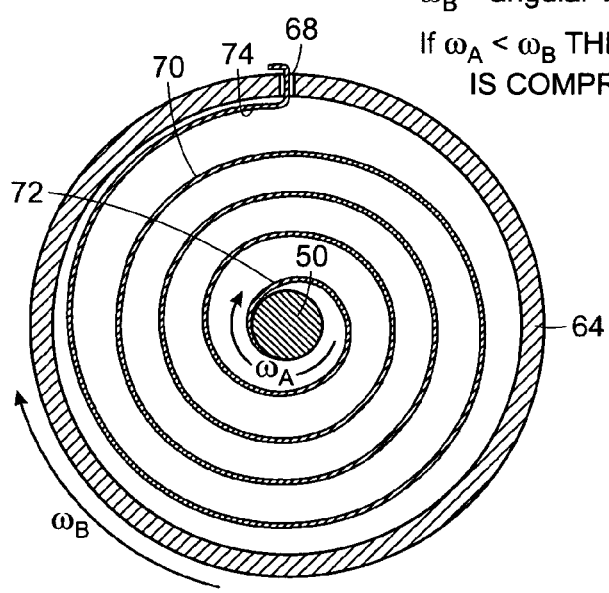
FIG. 4 is a cross-sectional view along line -5 . . . 5 of FIG. 2 depicting a cross sectional of the spring means inside the spring housing
Figure 5:
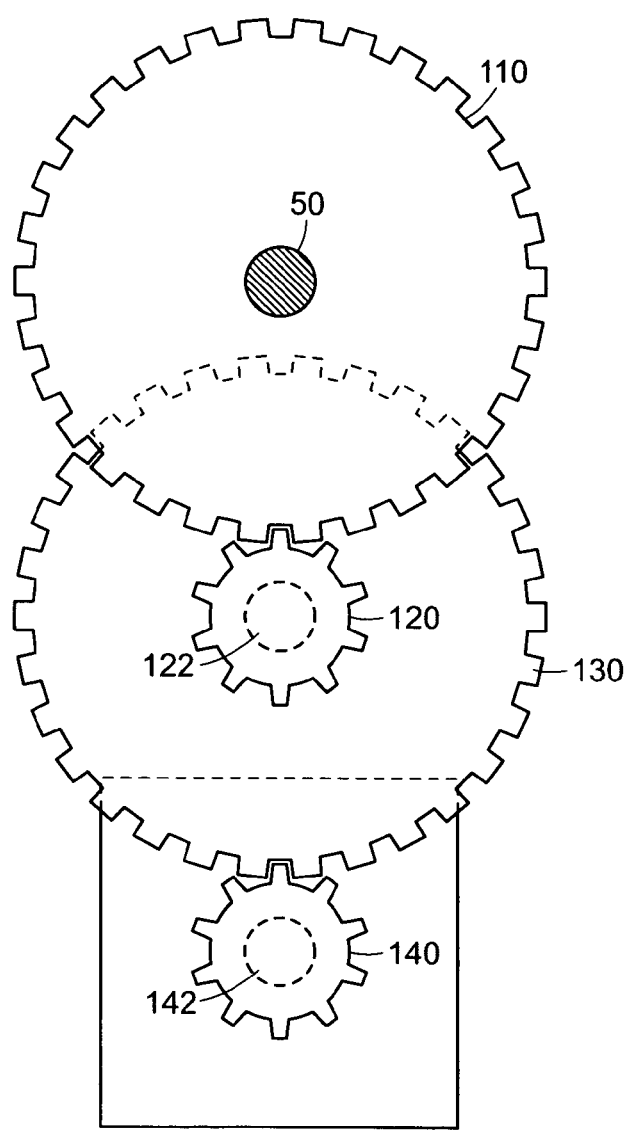
FIG. 5 is a cross-sectional view along lines 3 3 of FIG. 2 depicting the gear system to the generator

When spring 70 reaches the ratio described in FIG. 4, first shaft 50 begins to rotate in a counter clockwise rotation unwinding spring 70 at spring end 72 and turning first shaft 50 also in a counter clockwise direction.

Figure 3:
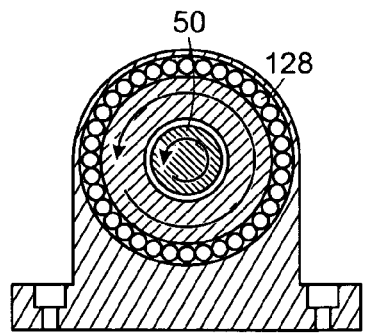
FIG. 3 is a cross-sectional view along line 6 . . . 6 of FIG. 2 depicting the ball bearing system between the first shaft means and the second shaft means

First toothed gear wheel 110 FIG. 2 and FIG. 3 is fixedly mounted to first shaft 50 and is connected to second toothed wheel gear 120 on shaft 122 which rotates third toothed wheel gear 130 which is connected to rotating gear 140 on shaft 142 which is connected to power generator 150 which converts this rotation into useful electric power on a continuous basis. The use of this system of gear reduction causes a constant velocity In this particular embodiment the device is installed on a site which is already in place, like an abandoned oil rig.

My device then generates energy on a continuous basis by taking advantage of the rise and fall of the swells in the ocean.

Several different modifications, changes and adaptations may be substituted by other types of design and are anticipated by my invention.

Accordingly, it is the intention of the inventor to include all such modifications which shall come within the true scope of my invention which is defined by the appended claims

The invention claimed is:

1. An improved motion energy collection device for extracting energy from an energy source which further comprises:

(a) a base;
(b) a first shaft means fixedly mounted to the base and rotatable about an axis;
(c) a second shaft means fixedly mounted to the base and rotatably adapted around the first shaft means further defining a spring housing portion thereon;
(d) a spring means contained within the spring housing portion of the second shaft means, attached at a first end thereof to the first shaft means and at a second end to the second shaft means;
(e) a winding means adapted to the base and connected at one point thereof to the energy source which rotates the winding means and connected at a second point to the second shaft means which is rotated by the winding means tightening the second end of the spring means to a designed point then unwinding the first end of the spring means rotating the first shaft means while continuing to wind the second end of the spring means;
(f) a generator means connected to the end of the first shaft means whereby electricity is generated by the rotation of the first shaft means.

2. The improved motion energy collection device of claim 1 wherein said base further comprises:
 (a) bearing means fixedly mounted to the base and rotatable positioned between the first shaft means and the second shaft means, the first shaft mean permitting the first shaft means to rotate as the spring means unwinds.

3. The improved motion energy collection device of claim 1 wherein the winding means further comprises:
 (a) one or more power arm means connected to the winding means at a first end;
 (b) float means connected at the second end of the power arm means and resting on the surface of the water movable between a first position at the bottom of a swell to a second position at the top of a swell;
 (c) connector means adapted to the power arm means at the first end thereof and to the second shaft means at the other end rotating the second shaft means as the float means moves between the first position at the bottom of the swell and the second position at the top of the swell, tightening the second end of the spring means to a designed point then unwinding the first end of the spring means rotating the first shaft means while continuing to wind the second end of the spring means each time the power arm means moves; between a first position at the bottom of a swell to a second position at the top of the swell.

4. The improved motion energy collection device of claim 3 wherein the connector means further comprises:
 (a) the second shaft means including longitudinal grooves therearound;
 (b) the ratchet connector means adapted to the power arm means at the first end thereof and releasably gripping the longitudinal grooves of the second shaft means and rotating the second shaft means as the float means moves between the first position at the bottom of the swell the second position at the top of the swell.

5. The improved motion energy collection device of claim 4 wherein the connector means further comprises: (a) torque wrench means rotatably adapted around the second shaft means adjacent the end thereof which activates at a certain compression of the spring means allowing the second shaft means to continue to rotate without winding the spring means until the spring means is unwound to reach the certain compression at which point the spring means renews winding the spring means.

6. An improved motion energy collection device for extracting energy from an energy source which further comprises:
 (a) a base;
 (b) a first shaft means fixedly mounted to the base and rotatable about an axis;
 (c) a second shaft means having longitudinal grooves therearound fixedly mounted to the base and rotatably adapted around the first shaft means further defining a spring housing portion thereon;
 (d) a spring means contained within the spring housing portion of the second shaft means, attached at a first end thereof to the first shaft means and at a second end to the second shaft means;
 (e) power arm means connected to the second shaft means at one end thereof and at the other end thereof to afloat means connected at the second end of the power arm means and resting on the surface of the water movable between a second position at the bottom of a swell to a first position at the top of a swell and adapted to the power arm means at the first end thereof;
 (f) ratchet means connected at one end to the power arm means and at the other end to the second shaft means releasably gripping the longitudinal grooves of the second shaft means tightening the second end of the spring means to a designed point then unwinding the first end of the spring means rotating the first shaft means while continuing to wind the second end of the spring means; as the float means moves between the second position at the top of the swell and the first position at the bottom of the swell;
 (g) bearing means fixedly mounted to the base and rotatable positioned between the first shaft means and the second shaft means permitting the first shaft means to rotate as the spring means unwinds;
 (h) generator means connected to the end of the first shaft means whereby electricity is generated by the rotation of the first shaft means.

\* \* \* \* \*